3,708,488
PROCESS FOR THE PREPARATION OF N,N'-DISULFIDE COMPOUNDS

Keisuke Murayama, Syoji Morimura, Susumu Higashida, Katsuaki Matsui, Tomoyuki Kurumada, and Noriyuki Onta, Tokyo, Japan, assignors to Sankyo Company Limited
No Drawing. Filed May 24, 1971, Ser. No. 146,527
Claims priority, application Japan, May 26, 1970, 45/45,067
Int. Cl. C07d 29/36
U.S. Cl. 260—293.63     7 Claims

ABSTRACT OF THE DISCLOSURE

Improved and commercially advantageous process for the preparation of an N,N'-disulfide compound having the formula

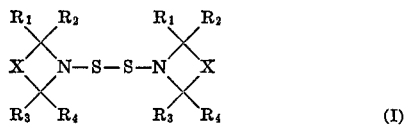

wherein $R_1$, $R_2$, $R_3$ and $R_4$ may be the same or different and each represents an alkyl group of 1 to 4 carbon atoms or $R_1$ and $R_2$ or $R_3$ and $R_4$, together with the carbon atom to which they are attached, may form a 5- or 6-membered saturated alicyclic group; and X represents the group

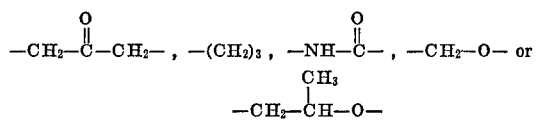

which comprises reacting a compound having the formula

wherein $R_1$, $R_2$, $R_3$, $R_4$ and X are as defined above with sulfur monochloride in the presence of a metal salt of an organic carboxylic acid as an acid-binding agent in an acid amide or nitrile solvent and, optionally, in the further presence of an acidic dehydrating agent, e.g., phosphoric anhydride. The N,N'-disulfide compounds having the above Formula I are useful, for instance, as a stabilizer of various synthetic polymers, especially polyurethane elastomers against their deteriorations by light, heat and chlorine.

---

This invention relates to improvements in the preparation of N,N'-disulfide compounds.

More particularly, this invention is concerned with an improved and commercially advantageous process for the the preparation of an N,N'-disulfide compound having the formula

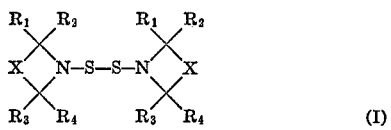

wherein $R_1$, $R_2$, $R_3$ and $R_4$ may be the same or different and each represents an alkyl group of 1 to 4 carbon atoms or a combination of $R_1$ and $R_2$ or of $R_3$ and $R_4$, together with the carbon to which they are attached, may form a 5- or 6-membered saturated alicyclic group; and X represents the group

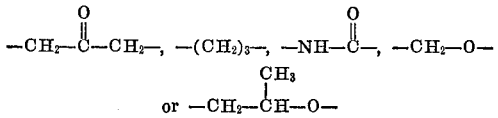

which comprises reacting an amine derivative having the formula

wherein $R_1$, $R_2$, $R_3$, $R_4$ and X are as defined above with sulfur monochloride in the presence of a metal salt of an organic carboxylic acid as an acid-binding agent in an acid amide or nitrile solvent.

In the above Formula I, each of the $R_1$, $R_2$, $R_3$ and $R_4$ may be illustratively represented by methyl, ethyl, n-propyl, isopropyl and n-butyl and the combination of the $R_1$ and $R_2$ or of the $R_3$ and $R_4$ as defined above may be illustrated by cyclopentyl and cyclohexyl.

It was heretofore reported in Tetrahedron, 23, 1697 (1967) that bis(2,2,6,6 - tetramethylpiperidino)disulfide and bis(2,2,6,6-tetramethyl - 4 - oxopiperidino)disulfide were prepared from the corresponding piperidines and sulfur dichloride ($SCl_2$). However, such a prior process has serious disadvantages from a commercial point of view, that is, employment of highly expensive and unstable sulfur dichloride and of commercially unfavourable, low temperature of about −40° C. as well as formation of the undesired trisulfide derivative.

Then, previous studies have been made by us in order to improve the above-mentioned prior process and it has been already found that the N,N'-disulfide compounds having the Formula I can be advantageously prepared in a high yield without disadvantages as depicted above by reacting the amine derivative having the Formula II with sulfur monochloride in an acid amide or nitrile solvent, the subject matter of which has been disclosed and claimed in our copending Japanese patent application No. 4,684/1970 filed on Jan. 17, 1970. However, this process was found to still retain some disadvantages to be improved and, particularly, an excessively large amount of the starting amine derivative (II) was required in such a process since a half amount of the starting amine derivative (II) initially employed should be consumed in situ as an acid-binding agent.

Now, as a result of our further studies to improve our prior process as depicted above, it has been found that the reaction of the starting amine derivative (II) with sulfur monochloride in the acid amine or nitrile solvent can be much more favourably conducted by the presence of a metal salt of an organic carboxylic acid even if the starting amine derivative (II) is employed only in a stoichiometric amount and thus the N,N'-disulfide compounds (I) can be much more advantageously prepared with a reduced or saved amount of the starting amine derivative (II) and without any procedure for the recovery of the unreacted amine derivative after completion of the reaction. This invention has been completed upon the above findings.

It is, accordingly, a primary object of this invention to provide an improved and commercially advantageous process for the preparation of the N,N'-disulfide compound (I).

Other objects and advantages of this invention will be apparent to those skilled in the art from the following description of this invention.

In carrying out the process of this invention, the reaction can be suitably carried out by bringing the amine derivative (II) dissolved in the acid amide or nitrile solvent into contact with sulfur monochloride dissolved in the specific solvent in the presence of the metal salt of an organic carboxylic acid.

Examples of the metal salts of organic carboxylic acids which may be employed as an acid-binding agent in the process of this invention include sodium, potassium, silver, zinc and aluminum salts of acetic, monochloroacetic, benzoic, p-methylbenzoic and p-anisic acids.

Examples of the acid amide or nitrile solvents which may be employed in the process of this invention include dimethylformamide, formamide, N-methylacetamide, acetonitrile and the like. The specific solvent as set forth above may be employed in the reaction either alone or in admixture with other suitable solvents, e.g., toluene, hexane and the like. In the latter case, the molar ratio of the specific acid amide or nitrile solvent to other solvent may usually and preferably be within the range of 1 or more:1.

The molar ratio of the starting amine derivative (II) to sulfur monochloride may usually be of about 1:about 0.5.

The molar ratio of the metal salt of organic carboxylic acid to sulfur monochloride may usually be of about 2 or more:about 1.

The reaction temperature is not a critical feature of this invention, but the reaction may be usually carried out at a temperature of about 0–50° C., preferably about 20° C.

The reaction period of time is also not a critical feature of this invention and may be varied upon the reaction temperature applied and other factors. Usually, the reaction has been completed in about 30 minutes to about 3 hours.

In another embodiment in the process of this invention, the reaction can be more favourably carried out by additionally incorporating a small amount of an acidic dehydrating agent, e.g., phosphoric anhydride into the reaction system.

After completion of the reaction, the reaction product may be readily recovered and purified from the reaction mixture by a conventional method. For instance, either the solvent is distilled off from the reaction mixture or the reaction mixture is poured into ice-water and then the crystalline substance so separated is recrystallized from a suitable solvent, e.g., methanol, n-hexane, petroleum benzine and the like to obtain the desired product (I) in a highly purified form and a high yield.

The N,N′-disulfide compounds of the Formula I are as such useful as a stabilizer for the photo- and thermal-deterioration of various synthetic polymers, e.g., polyolefins, polyvinyl chloride, polyamides, polyurethanes and the like, especially polyurethane elastomers.

Where the N,N′-disulfide compounds (I) are to be employed as a stabilizer, they may be readily incorporated into the synthetic polymers by various standard procedures commonly utilized in the art. The compounds (I) may be incorporated into the synthetic polymers at any desired stage prior to the manufacture of shaped articles therefrom. Thus, for example, the compounds (I) in the form of a powder may be mixed with the synthetic polymer, or a suspension or emulsion of the synthetic polymer.

The amount of the N,N′-disulfide compounds (I) may vary widely depending upon the type, properties and particular uses of the synthetic polymer to be stabilized. In general, the compounds of the synthetic polymer, but the practical range is varied depending upon the type of the synthetic polymer.

The compounds (I) may be used alone or in combination with other known stabilizers, fillers, pigments and the like.

If desired, two or more of the compounds (I) may also be satisfactorily used in admixture.

Representative of the N,N′-disulfide compounds having the Formula I which may be prepared by the process of this invention are as follows:

(1) bis(2,2,6,6-tetramethyl-4-oxopiperidino)disulfide;
(2) bis(2,2,6,6-tetramethylpiperidino)disulfide;
(3) bis(2,2,5,5-tetramethyl-4-oxo-1-imidazolidinyl)-disulfide;
(4) bis(1,4-diaza-2-ethyl-2-methyl-3-oxo-spiro[4.5]-1-decyl)disulfide;
(5) bis[cyclohexane-1-spiro-2′-(4′-oxo-1′-imidazolidinyl)-5′-spiro-1″-cyclohexane]disulfide;
(6) bis(1-aza-2,2-dimethyl-4-oxa-spiro[4.5]-1-decyl)-disulfide;
(7) bis(1-aza-2,2-dimethyl-4-oxa-spiro[4.4]-1-nonyl)-disulfide;
(8) bis(2-isobutyl-2,4,4-trimethyl-3-oxazolidinyl)-disulfide;
(9) bis(2,2,4,4,6-pentamethyltetrahydro-1,3-oxazin-3-yl)disulfide; and
(10) bis(1-aza-2,2,4-trimethyl-5-oxa-spiro[5.5]-1-undecyl)disulfide.

The amine derivatives (II) which may be employed as a starting material in the process of this invention are new substances except for 2,2,6,6-tetramethylpiperidine, 2,2,6,6-tetramethyl-4-oxo-piperidine and cyclohexane-1-spiro-2′-(4′-oxoimidazolidine) - 5′ - spiro-1″-cyclohexane. These new starting materials may be readily prepared, for example, according to the following reaction schemata:

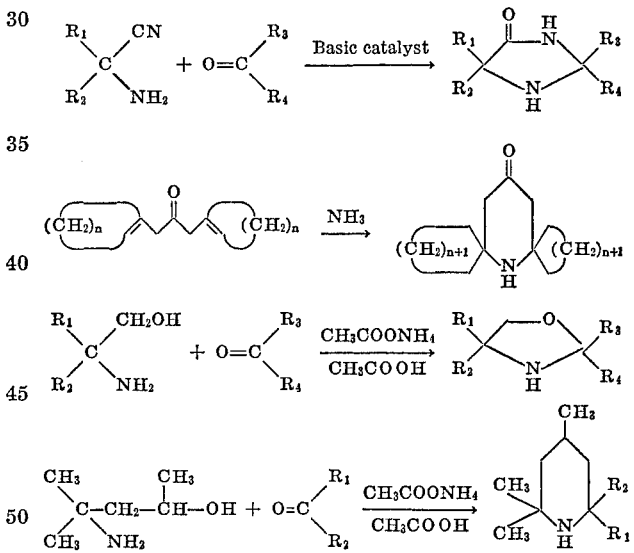

In the above formulae, $R_1$, $R_2$, $R_3$ and $R_4$ are as defined above and $n$ is an integer of 3 to 4 inclusive.

This invention will be further illustrated by the following non-limitative examples.

EXAMPLE 1

Bis(2,2,6,6-tetramethyl-4-oxopiperidino)disulfide

To a suspension of 16 g. of triacetonamine, 11 g. of sodium acetate, 2 g. of phosphoric anhydride and 20 ml. of dimethylformamide in 100 ml. of hexane was added dropwise with stirring a mixture of 6.7 g. of sulfur monochloride and 30 ml. of dimethylformamide at 5–10° C. After completion of the dropwise-addition, the reaction mixture was stirred at that temperature for 30 minutes. Then, the layers were separated and the hexane layer was removed. The residual solution was poured into water and the crystalline substance thus precipitated was recovered by filtration. The substance so obtained was washed with water, dried and then recrystallized from methanol to give 14.1 g. of the desired product as colorless prisms melting at 145–146° C. Yield 77.8% (based upon the sulfur monochloride).

*Analysis.*—For $C_{18}H_{32}N_2O_2S_2$: Calculated (percent): C, 58.04; H, 8.66; N, 7.52; S, 17.18. Found (percent): C, 58.11; H, 8.62; N, 7.61; S, 17.03.

EXAMPLE 2

Bis(2,2,6,6-tetramethyl-4-oxopiperidino)disulfide

The same procedure as in the above Example 1 was repeated except that 11 g. of zinc acetate was employed instead of 11 g. of the sodium acetate and the reaction was carried out at 10–15° C. to give 12.9 g. of the desired product. Yield 69.4% (based upon the sulfur monochloride). This product is identified with the product obtained in the above Example 1 by means of mixed melting point depression and infrared spectra.

EXAMPLE 3

Bis(2,2,6,6-tetramethyl-4-oxopiperidino)disulfide

To a suspension of 16 g. of triacetonamine, 18 g. of sodium benzoate and 2 g. of phosphoric anhydride in 80 ml. of dimethylformamide was added dropwise with stirring at 10–15° C. a mixture of 6.7 g. of sulfur monochloride and 30 ml. of dimethylformamide. After completion of the dropwise-addition, the reaction mixture was stirred at that temperature for 30 minutes. Then, the reaction mixture was poured into water and the resulting mixture was made alkaline by addition of sodium hydroxide. The crystalline substance thus separated was recovered by filtration, washed with water, dried and then recrystallized from methanol to give 14.4 g. of the desired product as colorless prisms melting at 145–146° C. Yield 79.5% (based upon the sulfur monochloride). This product is identified with that obtained in the above Example 1 by means of a mixed melting point depression and infrared spectra.

EXAMPLE 4

Bis(2,2,6,6-tetramethyl-4-oxopiperidino)disulfide

The same procedure as in the above Example 3 was repeated except that acetonitrile was employed instead of the dimethylformamide to give 12.2 g. of the desired product. Yield 61.0% (based upon the sulfur monochloride).

The same procedure as in the above Example 1 was repeated except that the following starting amines were employed instead of the triacetonamine, thereby yielding the desired product as shown below, respectively:

Starting amines 2,2,6,6-tetramethylpiperidine,
cyclohexane-1-spiro-2′-(4′-oxoimidazolidine)-5′-spiro-1″-cyclohexane,
1-aza-2,2-dimethyl-4-oxa-spiro[4.5]decane, and
1-aza-2,2,4-trimethyl-5-oxa-spiro[5.5]undecane.

Products

Bis(2,2,6,6-tetramethylpiperidino)disulfide: White crystals melting at 84–85° C. Yield 75.2% (based upon the sulfur monochloride).

*Analysis.*—For $C_{18}H_{36}N_2S_2$: Calculated (percent): C, 62.77; H, 10.53; N, 8.13; S, 18.58. Found (percent): C, 62.83; H, 10.58; N, 8.21; S, 18.45.

Bis[cyclohexane-1-spiro-2′-(4′-oxo-1′-imidazolidinyl)-5′-spiro-1″-cyclohexane]disulfide: White crystals melting at 236–273° C. Yield 62.3% (based upon the sulfur monochloride).

*Analysis.*—For $C_{26}H_{42}N_4O_2S_2$: Calculated (percent): C, 61.63; H, 8.36; N, 11.06; S, 12.62. Found (percent): C, 61.48; H, 8.33; N, 11.00; S, 12.78.

Bis(1-aza-2,2-dimethyl-4-oxa-spiro[4.5]-1-decyl)disulfide: White crystals melting at 84–86° C. Yield 80.6% (based upon the sulfur monochloride).

*Analysis.*—For $C_{20}H_{36}N_2O_2S_2$: Calculated (percent): C, 59.98; H, 9.06; N, 7.00; S, 15.97. Found (percent): C, 60.10; H, 8.99; N, 7.08; S, 16.00.

Bis(1-aza-2,2,4-trimethyl-5-oxa-spiro[5.5]-1-undecyl)disulfide: White crystals melting at 167.5–168.5° C. Yield 70.3% (based upon the sulfur monochloride).

*Analysis.*—For $C_{24}H_{44}N_2O_2S_2$: Calculated (percent): C, 63.13; H, 9.71; N, 6.14; S, 14.01. Found (percent): C, 63.01; H, 9.80; N, 6.15; S, 14.12.

What is claimed is:

1. A process for the preparation of a compound having the formula

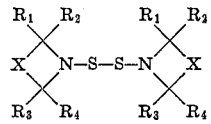

wherein $R_1$, $R_2$, $R_3$ and $R_4$ may be the same or different and each represents an alkyl group of 1 to 4 carbon atoms or $R_1$ and $R_2$ or $R_3$ and $R_4$, together with the carbon atom to which they are attached, may form a 5- or 6-membered saturated alicyclic group; and X represents the group $$-CH_2-\underset{\underset{O}{\|}}{C}-CH_2-,\ -(CH_2)_3-,\ -NH-\underset{\underset{O}{\|}}{C}-,\ -CH_2-O-\ \text{or}\ -CH_2-\underset{\underset{CH_3}{|}}{CH}-O-$$

which comprises reacting a compound having the formula

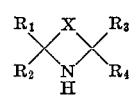

wherein $R_1$, $R_2$, $R_3$, $R_4$ and X are as defined above with sulfur monochloride in the presence of a metal salt of an organic carboxylic acid as an acid-binding agent in an acid amide or nitrile solvent.

2. The process according to claim 1 wherein said metal salt of an organic carboxylic acid is selected from the group consisting of sodium, potassium, silver, zinc and aluminum salts of acetic, monochloroacetic, benzoic, p-methylbenzoic and p-anisic acids.

3. The process according to claim 1 wherein said acid amide or nitrile solvent is selected from the group consisting of dimethylformamide, formamide, N-methylacetamide and acetonitrile.

4. The process according to claim 1 wherein the $R_1$, $R_2$, $R_3$ and $R_4$ individually represent methyl and the X represents the group

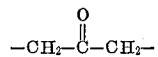

5. The process according to claim 1 wherein an acidic dehydrating agent is additionally present in the reaction system.

6. The process according to claim 5 wherein the $R_1$, $R_2$, $R_3$ and $R_4$ individually represent methyl and the X represents the group

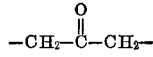

7. The process according to claim 5 wherein said dehydrating agent is phosphoric anhydride.

References Cited

UNITED STATES PATENTS 3,525,737  8/1970  Kern et al. ——————— 260—239.3

OTHER REFERENCES

Bennett et al.: Tetrahedron 23, 1697–9 (1967).

HENRY R. JILES, Primary Examiner

G. T. TODD, Assistant Examiner

U.S. Cl. X.R.

260—45.8 N, 244 R, 307 E, 309.7